Oct. 8, 1957
J. C. DUTTON
2,809,228
HIGH VOLTAGE BUSHING GROUND SLEEVE
Filed Sept. 26, 1955
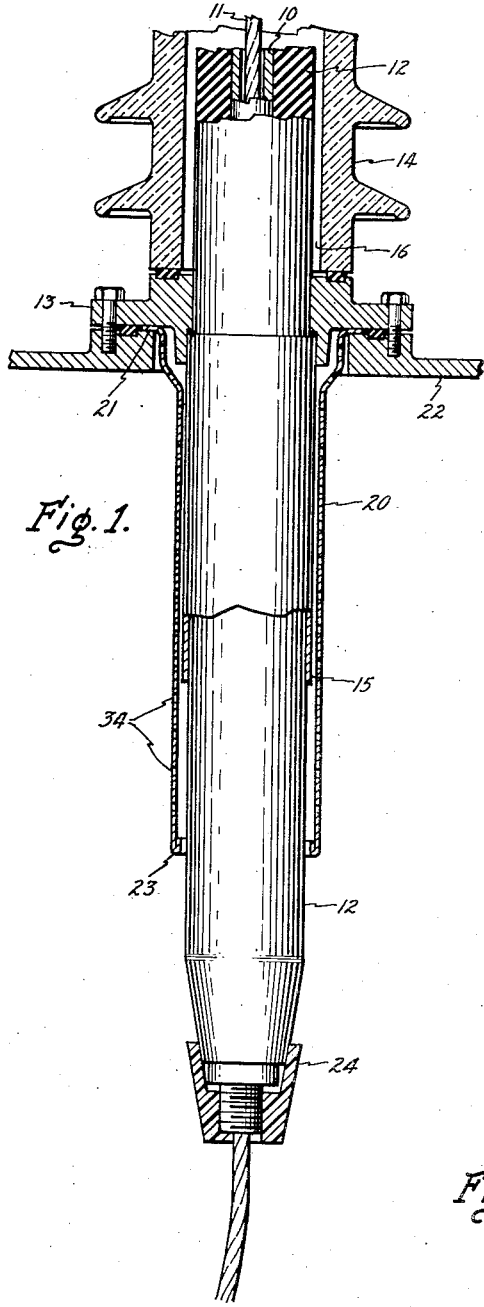
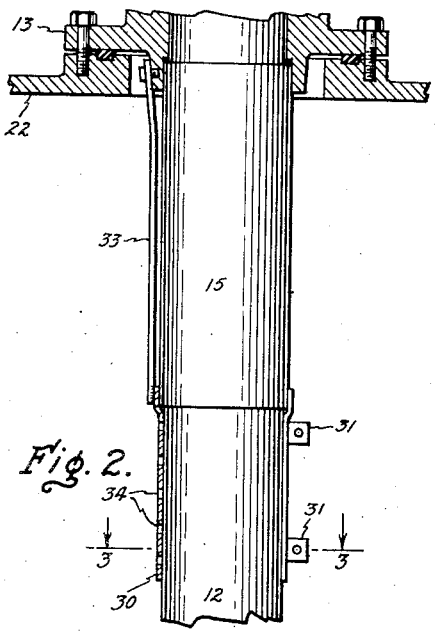
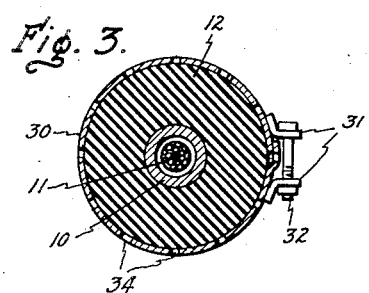
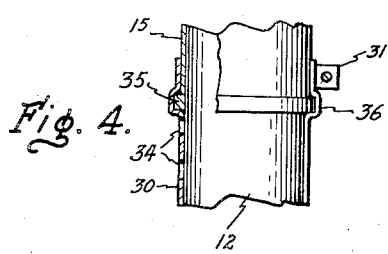
Inventor
John C. Dutton,
by Gilbert P. Tarlton
His Attorney.

United States Patent Office 2,809,228
Patented Oct. 8, 1957

2,809,228

HIGH VOLTAGE BUSHING GROUND SLEEVE

John C. Dutton, Rome, Ga., assignor to General Electric Company, a corporation of New York Application September 26, 1955, Serial No. 536,501

3 Claims. (Cl. 174—31)

This invention relates to high voltage bushings for stationary electrical apparatus, and more in particular to means providing interchangeability of high voltage bushings between transformer and circuit breaker application.

High voltage bushings for power transformers of one type are generally comprised of a central conductor which may be hollow extending through the bushing from an upper terminal assembly. The upper portion of the bushing has an external surface comprised of a tubular ceramic insulator extending from the terminal assembly to a centrally located annular metallic mounting flange. The central conductor is surrounded by a solid insulation material, such as a plurality of layers of paper impregnated with resin, that extends from the lower end of the bushing through the mounting flange and for a portion of the distance between the mounting flange and the upper terminal assembly. The annular space surrounding the upper portion of the solid insulation and central conductor inside of the ceramic insulator may be filled with a dielectric fluid. A tubular metallic ground sleeve is press fitted on the lower portion of the solid insulation and extends from the mounting flange a portion of the distance between the mounting flange and the lower end of the bushing. Suitable gaskets are provided to prevent the escape of dielectric fluid from the upper annular chamber. A conducting cable is provided extending through the central conductor from the upper terminal assembly, the cable being connected to the transformer windings.

The above-described bushing differs from a bushing of the same class for use on circuit breakers primarily by the fact that the circuit breaker bushing utilizes the central conductor to carry the current and thereby does not need a cable, and also in the length of the ground sleeve. Standard practice dictates that a predetermined strike distance is required between the bottom of the ground sleeve and the lower end of the bushing for circuit breaker application. In transformer applications, however, the strike distance required is not as great, and therefore the ground sleeves are generally made somewhat longer in order to obtain the added benefit from the increased length of the ground sleeve.

In the past although interchangeability of the various components of high voltage bushings enabled the use of identical terminal parts and other components on bushings used for these two applications, it was not feasible to provide interchangeable completely assembled bushings due to the difference in length of the ground sleeves. Thus this structural difference required a manufacturer to provide bushings of both types, and a user to stock bushings of both types, thereby resulting in an increased cost of each type of bushing.

It is therefore an object of this invention to provide means enabling interchangeable use of high voltage bushings for transformer and circuit breaker applications.

Another object of this invention is to provide auxiliary ground sleeve means in combination with a high voltage bushing in order that a bushing designed for circuit breaker application may be interchangeably used on circuit breakers and power transformers.

Briefly stated, in accordance with one aspect of my invention, I provide means for extending the ground sleeve of a high voltage bushing designed for circuit breaker application comprising an annular metallic tube or sleeve that is adapted to surround the ground sleeve of the bushing and extends from the mounting flange of the bushing and beyond the lower end of the bushing ground sleeve. In accordance with another aspect of my invention, the auxiliary ground sleeve is comprised of a split tubular metallic section that may be clamped onto the lower end of the bushing ground sleeve in order to provide the necessary extension thereof for transformer applications. In order to eliminate the possibility of voids between the auxiliary ground sleeve and the lower solid insulation material, the auxiliary ground sleeve may be perforated and the outer surface of the solid insulation material may be lightly coated with a sealing compound, so that when the split sleeve is tightened on the bushing, the sealing compound fills voids, which would otherwise be filled with air and might thereby result in corona, and the surplus compound and any air will be squeezed out through the perforations.

My invention will be better understood from the following description taken in connection with the accompanying drawing and its scope will be pointed out in the appended claims.

In the drawing:

Fig. 1 is a partially cross-sectional view of a portion of a high voltage bushing illustrated in combination with one form of the auxiliary ground sleeve of my invention, Fig. 2 is a partially cross-sectional view of a portion of a high voltage bushing in combination with another form of the auxiliary ground sleeve of my invention, Fig. 3 is a cross-sectional view of the bushing of Fig. 2 along the lines 3—3, and Fig. 4 illustrates an alternative method of clamping the auxiliary ground sleeve of Figs. 2 and 3 to the bushing ground sleeve.

Referring now to the drawing, and more in particular to Fig. 1 therein is illustrated a bushing comprised of a central conductor 10 which may be hollow and through which a conducting cable 11 extends. The central conductor 10 is surrounded by a solid insulation material 12, which is preferably machinable, and may be comprised of a plurality of layers of paper and impregnated with resin. An annular metallic mounting flange 13 surrounds the central portion of the solid insulator 12, and a ceramic insulating tube 14, extends upwardly from the mounting flange. A close fitting metallic ground sleeve 15 surrounds a portion of the solid insulation and extends from the mounting flange 13 a portion of the distance toward the lower end of the bushing. A dielectric fluid may be introduced into the annular space 16 between the solid insulation material 12 and the ceramic insulator 14, and suitable gaskets may be provided between the ceramic insulator and mounting flange, and ground sleeve, solid insulation and mounting flange to prevent escape of fluid from the annular space 16.

The electrical strike distance between the lower ends of the bushing and the lower end of the ground sleeve 15 is specified to be a predetermined distance for circuit breaker application, while for transformer application, as great a distance is not required and is therefore undesirable in order to obtain the benefits from a longer permissible ground sleeve. In order to effectively extend the length of the ground sleeve of the bushing of Fig. 1, an auxiliary ground sleeve 20 is provided surrounding the lower end of the bushing and extending from the metallic mounting flange and beyond the lower end of the ground sleeve 15. In the drawing of Fig. 1, the ground sleeve 15 is shown having a length suitable for circuit breaker application, and the auxiliary ground sleeve 20 is shown having a length suitable for transformer application. The upper end of the auxiliary ground sleeve 20 may be flanged, and the flanged portion 21 may be compressed between the mounting flange 13 and a tank wall 22 of electrical apparatus in order that the auxiliary ground sleeve has mechanical stability and is electrically grounded. The lower end 23 of the auxiliary ground sleeve 20 may be rounded if desired. If desired, a plastic insulating end collar 24 may be threaded onto the lower end of the hollow conductor 10 in order to reduce the strike distance.

In the modification of my invention illustrated in Figs. 2 and 3, the auxiliary ground sleeve 30 is in the form of a split metallic tube. Opposing lugs 31 are provided on either side of the split of the sleeve 30 and screws 32 passing through these lugs provide circumferential forces on the split sleeve so that the sleeve 30 may be tightly fastened around the solid insulation 12. The top edge of the sleeve 30 is slightly enlarged so that it laps over the lower end of the bushing ground sleeve and makes electrical contact therewith. The split edges of the auxiliary ground sleeve 30 may be overlapped if desired. The position of the auxiliary ground sleeve on the bushing is maintained positively by means of a metal strap 33 brazed to the split sleeve and bolted to the underside of the mounting flange 13.

Although the auxiliary sleeve is in close physical contact with the solid insulation, there is always a possibility that there may be air in the space between these two members. In order to prevent the possibility of such voids, which may result in corona between the auxiliary ground sleeve and solid insulation, the auxiliary ground sleeve 30 may be provided with a plurality of small holes 34 extending therethrough. Before assembling the auxiliary sleeve on the lower end of the bushing, the portion of the solid insulation to be covered by the sleeve may be lightly coated with a sealing compound suitable for use in transformer oil. When the split sleeve is tightened, the sealing compound will fill the voids which would otherwise be filled with air and might result in corona. Any surplus sealing compound and any air will be squeezed out through the small holes in the perforated sleeve and the compound may thereafter be wiped off on the outside surface of the auxiliary sleeve.

If desired, in order to provide better contact between the auxiliary ground sleeve and the bushing ground sleeve in the modification of Fig. 2, the lower end of the bushing ground sleeve (see Fig. 4) may be provided with a short collar 35 having a larger diameter than the remaining portions of the bushing ground sleeve. In this event a groove 36 is provided in the auxiliary ground sleeve, and the auxiliary ground sleeve 36 is placed on the lower end of the bushing so that the groove 36 is positioned over the collar 35.

While the invention has been particularly described with reference to one type of high voltage bushing, it will be obvious to those skilled in the art that identical or similar arrangements may be provided with other types of bushings without departing from the spirit or scope of my invention.

The arrangement of my invention enables the interchangeability of standard high voltage bushings on circuit breakers and transformers, and therefore provides for a reduced cost in such bushings since only a single bushing of a given class need be manufactured or stocked. The arrangement requires only a minimum number of components, and the additional components are only required in the case of transformer applications.

It will be understood, of course, that, while the forms of the invention herein shown and described constitute preferred embodiments of the invention it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A high voltage bushing assembly for interchangeable use on transformers and circuit breakers comprising a central conductor extending through said bushing a centrally located annular metallic mounting flange surrounding said central conductor, solid insulation material surrounding said central conductor and extending from one end of said bushing and through said mounting flange, a close fitting metallic ground sleeve surrounding said solid insulation and extending from said mounting flange for a predetermined distance toward said one end of said bushing to provide the necessary strike distance between the end of said ground sleeve and said one end of said bushing for circuit breaker application, said ground sleeve being electrically connected to said mounting flange, and close fitting detachable auxiliary ground sleeve means surrounding said solid insulation and electrically connected to said mounting flange, said auxiliary ground sleeve means comprising a split metallic sleeve overlapping the end of said ground sleeve toward said one end of said bushing and extending beyond said end for a distance sufficient to provide the desired strike distance from the end of said auxiliary ground sleeve means to said one end of said bushing for transformer applications, and means for holding said auxiliary ground sleeve tightly around said solid insulation.

2. A high voltage bushing assembly for interchangeable use on transformers and circuit breakers comprising a central conductor extending through said bushing, a centrally located annular metallic mounting flange surrounding said central conductor, solid insulation material surrounding said central conductor and extending from one end of said bushing and through said mounting flange, a close fitting metallic ground sleeve surrounding said solid insulation and extending from said mounting flange for a predetermined distance toward said one end of said bushing to provide the necessary strike distance between the end of said ground sleeve and said one end of said bushing for circuit breaker application, said ground sleeve being electrically connected to said mounting flange, close fitting detachable auxiliary ground sleeve means surrounding said solid insulation and electrically connected to said mounting flange, and a sealing compound between said auxiliary ground sleeve means and said solid insulation, said auxiliary ground sleeve means comprising a split metallic sleeve perforated with a plurality of small holes and overlapping the end of said ground sleeve toward said one end of said bushing, said auxiliary ground sleeve extending beyond said ground sleeve for a distance sufficient to provide the desired strike distance from the end of said auxiliary ground sleeve means to said one end of said bushing for transformer application, and means for holding said auxiliary ground sleeve tightly around said solid insulation.

3. A high voltage bushing assembly for power transformers comprising a central conductor extending through said bushing, a centrally located annular metallic mounting flange surrounding said central conductor, solid insulation material surrounding said central conductor and extending from one end of said bushing and through said mounting flange, a close fitting metallic ground sleeve surrounding said solid insulation and extending from said mounting flange toward said one end of said bushing, the length of said ground sleeve being less than that desired for use of said bushing on power transformers, said ground sleeve being electrically connected to said mounting flange, a close fitting auxiliary ground sleeve means surrounding said solid insulation means and being electrically connected to said mounting flange, said auxiliary ground sleeve means comprising a split metallic sleeve and overlapping the end of said ground sleeve toward said one end of said bushing and extending beyond said ground sleeve toward said one end of said bushing to provide the total overall length of ground shielding desired for said bushing for use in a power transformer, means for tightly holding said auxiliary ground sleeve means around said solid insulation, and a sealing compound between said auxiliary ground sleeve means and said solid insulation, said auxiliary ground sleeve means being perforated with a plurality of small holes such that when said auxiliary ground sleeve means is tightened around said solid insulation any air and excess sealing compound between said auxiliary ground sleeve means and solid insulation is forced through said holes to eliminate voids between said auxiliary ground sleeve means and said solid insulation.

References Cited in the file of this patent

"New Apparatus Bushing" (Anderson, et al.), published in Trans. of the A. I. E. E., August 1952, vol. 71, part III, pages 628–630. (Copy in Scientific Library or in Division 69.)